US012756600B2

(12) United States Patent
Luo et al.

(10) Patent No.: US 12,756,600 B2
(45) Date of Patent: Oct. 6, 2026

(54) TRANSMITTER EQUALIZATION PARAMETER EVALUATION METHOD AND APPARATUS

(71) Applicant: Huawei Technologies Co., Ltd., Shenzhen (CN)

(72) Inventors: Junping Luo, Shenzhen (CN); Wei Pan, Shenzhen (CN); Er Nie, Shenzhen (CN); Jiankang Li, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 210 days.

(21) Appl. No.: 18/599,570

(22) Filed: Mar. 8, 2024

(65) Prior Publication Data

US 2024/0214245 A1 Jun. 27, 2024

Related U.S. Application Data

(63) Continuation of application No. PCT/CN2022/112094, filed on Aug. 12, 2022.

(30) Foreign Application Priority Data

Sep. 9, 2021 (CN) ......................... 202111057180.3

(51) Int. Cl.
*G06F 13/00* (2006.01)
*H04L 25/03* (2006.01)

(52) U.S. Cl.
CPC ........ *H04L 25/03* (2013.01); *H04L 25/03006* (2013.01); *H04L 2025/03777* (2013.01)

(58) Field of Classification Search
CPC ............... H04L 25/03; H04L 25/03006; H04L 2025/03777; H04L 2025/03764; H04L 25/03343; H04L 25/03885
(Continued)

(56) References Cited

U.S. PATENT DOCUMENTS

2006/0050726 A1* 3/2006 Ahmed ............ H04L 25/03133 370/437
2013/0067127 A1* 3/2013 Hopgood ................ G06F 13/00 710/104

(Continued)

FOREIGN PATENT DOCUMENTS

CN 105765883 A 7/2016
CN 106294267 A 1/2017

(Continued)

*Primary Examiner* — Henry Tsai
*Assistant Examiner* — Kim T Huynh
(74) *Attorney, Agent, or Firm* — Conley Rose, P.C.

(57) ABSTRACT

A transmitter equalization parameter evaluation method for evaluating a transmitter equalization parameter of a high-speed interface in a first device is performed by a second device coupled to the first device over a communication link. The second device detects a status of the communication link between the first device and the second device, where the communication link is constructed through the high-speed interface in the first device. When the communication link is idle, the second device performs a transmitter equalization parameter evaluation process of the high-speed interface in the first device based on the communication link. When the communication link is idle, the transmitter equalization parameter evaluation process of the high-speed interface in the first device is started.

20 Claims, 3 Drawing Sheets

(58) Field of Classification Search
USPC .......................................... 710/305, 100, 316
See application file for complete search history.

(56) References Cited

U.S. PATENT DOCUMENTS

| | | | | |
|---|---|---|---|---|
| 2024/0111354 | A1* | 4/2024 | Srivastava | G06F 1/3209 |
| 2024/0214245 | A1* | 6/2024 | Luo | H04L 25/03343 |

FOREIGN PATENT DOCUMENTS

| | | | |
|---|---|---|---|
| CN | 112714084 | A | 4/2021 |
| JP | 2007318227 | A | 12/2007 |

* cited by examiner

| PS DE BOOST | | $C_{+1}$ | | | | | | | | |
|---|---|---|---|---|---|---|---|---|---|---|
| | | 0/24 | 1/24 | 2/24 | 3/24 | 4/24 | 5/24 | 6/24 | 7/24 | 8/24 |
| $C_{-1}$ | 0/24 | 0.0 0.0 **P4** 0.0 | 0.0 −0.8 0.8 | 0.0 −1.6 1.6 | 0.0 −2.5 **P3** 2.5 | 0.0 −3.5 **P1** 3.5 | 0.0 −4.7 **P2** 4.7 | 0.0 −6.0 **P0** 6.0 | 0.0 −7.6 7.6 | 0.0 −9.5 9.5 |
| | 1/24 | 8.0 0.0 8.0 | 0.8 −0.8 0.0 | 0.9 −1.7 2.5 | 1.0 −2.8 3.5 | 1.2 −3.9 4.7 | 1.3 −5.3 6.0 | 1.6 −6.8 7.6 | 1.9 −8.8 9.5 | |
| | 2/24 | 1.6 0.0 **P5** 1.6 | 1.7 −0.9 2.5 | 1.9 −1.9 3.5 | 2.2 −3.1 4.7 | 2.5 −4.4 6.0 | 2.9 −6.0 **P7** 7.6 | 3.5 −8.0 9.5 | | |
| | 3/24 | 2.5 0.0 **P6** 2.5 | 2.8 −1.0 3.5 | 3.1 −2.2 4.7 | 3.5 −3.5 **P8** 6.0 | 4.1 −5.1 7.6 | 4.9 −7.0 9.5 | | | |
| | 4/24 | 3.5 0.0 **P9** 3.5 | 3.9 −1.2 4.7 | 4.4 −2.5 6.0 | 5.1 −4.1 7.6 | 6.0 −6.0 9.5 | | | | |
| | 5/24 | 4.7 0.0 4.7 | 5.3 −1.3 6.0 | 6.0 −2.9 7.6 | 7.0 −4.9 9.5 | | | | | |
| | 6/24 | 6.0 0.0 6.0 | 6.8 −1.6 7.6 | 8.0 −3.5 9.5 | | | | | | |

TRANSMITTER EQUALIZATION PARAMETER EVALUATION METHOD AND APPARATUS

CROSS-REFERENCE TO RELATED APPLICATIONS

This is a continuation of International Patent Application No. PCT/CN2022/112094 filed on Aug. 12, 2022, which claims priority to Chinese Patent Application No. 202111057180.3 filed on Sep. 9, 2021. The disclosures of the aforementioned applications are hereby incorporated by reference in their entireties.

TECHNICAL FIELD

This disclosure relates to the field of communications technologies, and in particular, to a transmitter equalization parameter evaluation method and an apparatus.

BACKGROUND

When a communication link is established between devices, a negotiation process of the communication link is first performed. The negotiation process includes transmitter equalization parameter evaluation of the device, that is, a transmitter equalization parameter evaluation process needs to be performed. A transmitter equalization parameter that matches the communication link needs to be selected in the transmitter equalization parameter evaluation process.

In the transmitter equalization parameter evaluation process, a large quantity of transmitter equalization parameters needs to be evaluated one by one. Because the transmitter equalization parameter evaluation process has a time limitation, not all the transmitter equalization parameters can be evaluated within a limited time period in the transmitter equalization parameter evaluation process, and a finally determined transmitter equalization parameter may be inappropriate. This reduces a data transmission effect of the communication link.

SUMMARY

This disclosure provides a transmitter equalization parameter evaluation method and an apparatus, to improve efficiency of a transmitter equalization parameter evaluation.

According to a first aspect, an embodiment of this disclosure provides a transmitter equalization parameter evaluation method, where the method may be for evaluating a transmitter equalization parameter of a high-speed interface in a first device, and the method may be performed by a second device connected to the first device over a communication link. In the method, the second device may first detect a status of the communication link between the first device and the second device, where the communication link is constructed through the high-speed interface in the first device, and is for connecting the first device and the second device. When determining that the communication link between the first device and the second device is idle, the second device may perform a transmitter equalization parameter evaluation process of the high-speed interface in the first device based on the communication link.

According to the foregoing method, when the communication link between the first device and the second device is idle, the transmitter equalization parameter evaluation process of the high-speed interface in the first device is started, so that time during which the communication link is idle can be effectively used, and that a large quantity of the transmitter equalization parameters can be evaluated may be ensured, to obtain an appropriate transmitter equalization parameter. This ensures efficiency of transmitter equalization parameter evaluation.

In a possible implementation, in a process of which the first device and the second device perform the transmitter equalization parameter evaluation process of the high-speed interface in the first device, the first device and the second device may exit the transmitter equalization parameter evaluation process of the high-speed interface in the first device at any time.

When determining that an evaluation exit condition is met, the second device may exit a transmitter equalization parameter evaluation process of a first interface in the first device.

A manner in which the second device exits the transmitter equalization parameter evaluation process of the first interface in the first device is not limited herein. The second device may send a message to the first device, to notify the first device that the second device needs to exit the transmitter equalization parameter evaluation process of the first interface in the first device. Alternatively, the second device may directly exit the transmitter equalization parameter evaluation process of the first interface in the first device, and switch to a normal working state. For example, a normal working state in a Peripheral Component Interconnect Express (PCIe) standard may be an L0 state.

When determining that the first device needs to communicate with the second device, or needs to perform another operation, the first device may exit the transmitter equalization parameter evaluation process of the first interface in the first device.

A manner in which the first device exits the transmitter equalization parameter evaluation process of the first interface in the first device is not limited herein. The first device may send a message to the second device, to notify the second device that the first device needs to exit the transmitter equalization parameter evaluation process of the first interface in the first device. Alternatively, the first device may directly exit the transmitter equalization parameter evaluation process of the first interface in the first device, and switch to a normal working state.

According to the foregoing method, the first device and the second device may exit the transmitter equalization parameter evaluation process of the first interface in the first device at any time, and normal services of the first device and the second device are not affected.

In a possible implementation, the evaluation exit condition includes all or some of the following:

- Condition 1: The second device needs to communicate with the first device.
- Condition 2: A quantity of evaluated transmitter equalization parameters reaches a threshold.
- Condition 3: A transmitter equalization parameter that passes the evaluation is obtained in the transmitter equalization parameter evaluation process of the high-speed interface in the first device. The transmitter equalization parameter that passes the evaluation indicates that an evaluation result of the transmitter equalization parameter passes or pass ratio of the transmitter equalization parameter is higher than the threshold.

According to the foregoing method, the evaluation exit condition includes a plurality of different conditions, and is applicable to different application scenarios.

In a possible implementation, that the communication link is idle indicates that service data is not transmitted on the communication link.

According to the foregoing method, the transmitter equalization parameter evaluation process may be performed when the service data is not transmitted, to ensure effective transmission of the service data.

In a possible implementation, when the second device detects the status of the communication link between the first device and the second device, the second device may detect whether the second device sends service data or receives service data over the communication link, and when the second device sends the service data or receives the service data over the communication link, that the communication link is busy is described, and when the second device does not send the service data over the communication link and does not receive the service data, that the communication link is idle is described. Alternatively, the second device may determine whether to-be-sent service data exists on a second device side, when the to-be-sent service data exists on the second device side, that the communication link is busy or is to be in a busy state in a short time (the communication link may be considered to be busy in this case), and when no to-be-sent service data exists on the second device side, the second device may consider that the communication link is idle.

According to the foregoing method, the second device detects the status of the communication link in a plurality of different manners, and the manners are flexible.

In a possible implementation, when performing the transmitter equalization parameter evaluation process of the high-speed interface in the first device based on the communication link, the second device may evaluate one group or a plurality of groups of transmitter equalization parameters. In the evaluation process, the second device may interact with the first device based on the communication link and the one group or the plurality of groups of transmitter equalization parameters, to evaluate the one group or the plurality of groups of transmitter equalization parameters.

According to the foregoing method, in the transmitter equalization parameter evaluation process of the high-speed interface in the first device, that at least one group of transmitter equalization parameters is evaluated can be ensured, thereby ensuring effectiveness of the entire evaluation process.

In a possible implementation, when the communication link is idle, the second device may start the transmitter equalization parameter evaluation process of the high-speed interface in the first device for a plurality of times, to evaluate all possible transmitter equalization parameters. In other words, the evaluated plurality of groups of transmitter equalization parameters include all the transmitter equalization parameters of the high-speed interface in the first device.

According to the foregoing method, the second device can traverse all the possible transmitter equalization parameters, to evaluate the transmitter equalization parameter of the high-speed interface in the first device, to ensure that transmitter equalization parameters with better effects can be evaluated.

In a possible implementation, the second device may further select a transmitter equalization parameter based on an evaluation result of the one group or the plurality of groups of transmitter equalization parameters, and then send the selected group of transmitter equalization parameters to the first device, to indicate that the selected transmitter equalization parameter is available.

Alternatively, the second device may send the evaluation result of the one or the plurality of groups of transmitter equalization parameters to the first device, and the first device selects an available transmitter equalization parameter.

According to the foregoing method, the second device may notify the first device of the available transmitter equalization parameter, so that the first device may configure the transmitter equalization parameter for the high-speed interface, to ensure that effective data transmission may be implemented subsequently.

In a possible implementation, the transmitter equalization parameter evaluation process of the high-speed interface in the first device may include a transmitter equalization parameter evaluation process at different transmission rates. In other words, the transmitter equalization parameter evaluation process of the high-speed interface in the first device includes a transmitter equalization parameter evaluation process at one or more transmission rates, and the transmission rate is a transmission rate of data in the communication link.

According to the foregoing method, transmitter equalization parameters applicable to different transmission rates may be different, and the transmitter equalization parameters applicable to different transmission rates may be obtained in a transmitter equalization parameter evaluation process at different transmission rates.

In a possible implementation, when performing the transmitter equalization parameter evaluation process of the high-speed interface in the first device based on the communication link, the second device may send a notification message to the first device, where the notification message indicates a transmission rate. In this way, the first device may determine a transmission rate at which a subsequent transmitter equalization parameter evaluation process is performed. Then, the second device may perform the transmitter equalization parameter evaluation process of the high-speed interface in the first device based on the communication link at the transmission rate.

Alternatively, the second device may do not send the notification message, and directly switch the transmission rate.

According to the foregoing method, the second device notifies the first device of the transmission rate, to ensure that the first device can cooperate with the first device to perform the transmitter equalization parameter evaluation process of the high-speed interface in the first device at different transmission rates, and the first device can adapt to different transmission rates in a timely manner.

According to a second aspect, an embodiment of this disclosure further provides an evaluation apparatus, where the evaluation apparatus has a function of implementing behaviors in the method instances in the first aspect. For beneficial effects, refer to descriptions of the first aspect, and details are not described herein again. The function may be implemented by hardware, or may be implemented by hardware by executing corresponding software. The hardware or software includes one or more modules corresponding to the foregoing function. In a possible design, a structure of the apparatus includes a detection module and a parameter evaluation module. Optionally, the structure of the apparatus further includes a selection module and a sending module. These modules may perform corresponding functions in the method instances in the first aspect. For details, refer to detailed descriptions in the method instances, and details are not described herein again.

According to a third aspect, an embodiment of this disclosure further provides a computing device, where the computing device has a function of implementing behaviors in the method instances in the first aspect. For beneficial effects, refer to descriptions of the first aspect, and details are not described herein again. A structure of the computing device includes a processor and a memory (the memory herein may also be understood as an internal memory, or may be understood as an internal memory and an external memory such as a hard disk), and the processor is configured to support the evaluation apparatus in performing a corresponding function in the method according to the first aspect. The memory is coupled to the processor, and stores necessary program instructions and data for the computing device. The structure of the computing device further includes a communications interface (that is, a second interface mentioned in method embodiments) configured to communicate with another device. For example, the communications interface may send information that needs to be sent in a transmitter equalization parameter evaluation process of a high-speed interface in a first device, and send a transmitter equalization parameter or an evaluation result of the transmitter equalization parameter.

According to a fourth aspect, this disclosure further provides a computer-readable storage medium, where the computer-readable storage medium stores instructions, and when the instructions are run on a computer, the computer is enabled to perform the method according to the first aspect and any possible implementations of the first aspect.

According to a fifth aspect, this disclosure further provides a computer program product including instructions. When the computer program product is run on a computer, the computer is enabled to perform the method according to the first aspect and any possible implementations of the first aspect.

According to a sixth aspect, this disclosure further provides a computer chip, where the chip is connected to a memory, and the chip is configured to read and execute a software program stored in the memory, to perform the method according to the first aspect and any possible implementations of the first aspect.

DESCRIPTION OF EMBODIMENTS

For two devices that need to communicate with each other, data transmission may be implemented over a communication link between interfaces of the devices. Similarly, for two modules that need to communicate with each other in a device, data transmission may also be implemented over a communication link between interfaces of the modules. In embodiments of this disclosure, an example of a communication process of devices is described over a communication link between interfaces of the device. A communication process between the modules is similar to a communication process between the devices, and details are not described herein again. The following describes structures of an interface 1 and an interface 2.

Figures 1, 2:
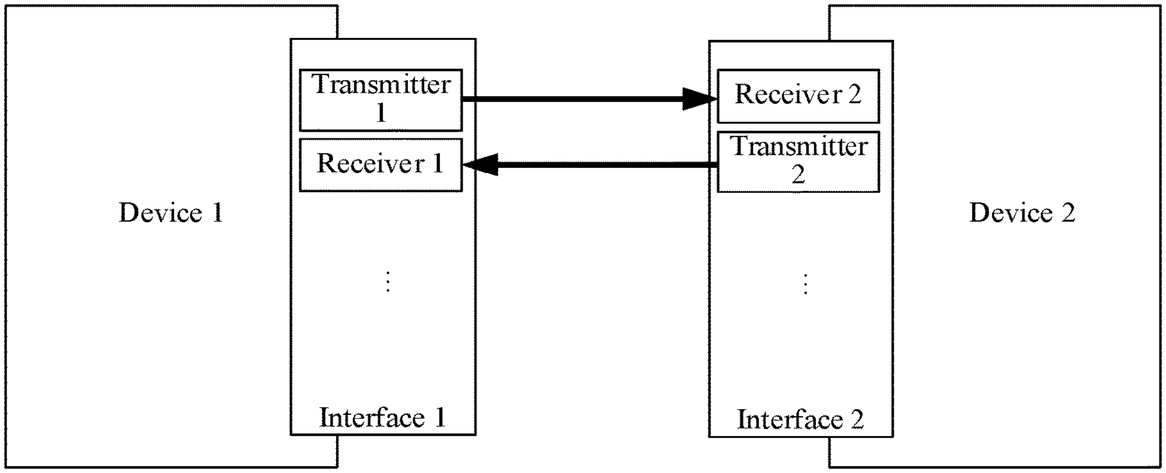
FIG. 1 is a schematic diagram of a connection relationship between devices in a transmitter equalization parameter evaluation process.
FIG. 2 is a schematic diagram of a plurality of groups of transmitter equalization parameters that may be evaluated according to this disclosure.

Refer to FIG. 1. An interface 1 is disposed on a device 1, and the interface 1 includes a transmitter 1 and a receiver 1. An interface 2 is disposed on a device 2, and the interface 2 includes a transmitter 2 and a receiver 2.

The transmitter 1 and the transmitter 2 are configured to send data, and the receiver 1 and the receiver 2 are configured to receive data. The transmitter 1 and the receiver 2 may be connected through a signal cable. Data sent by the transmitter 1 may be transmitted to the receiver 2 through a signal cable. The receiver 1 and the transmitter 2 may be connected by using a signal cable. Data sent by the transmitter 2 may be transmitted to the receiver 1 through a signal cable. A communication link between the interface 1 and the interface 2 may include a signal cable between the transmitter 1 and the receiver 2, and a signal cable between the receiver 1 and the transmitter 2.

When the device 1 needs to send data to the device 2, a processor in the device 1 may send the data to the receiver 2 through the signal cable by using the transmitter 1 in the interface 1, and then the receiver 2 transmits the received data to a processor of the device 2.

In a process of transmitting the data from the transmitter 1 to the receiver 2, data attenuation or interference exists. If the transmitter 1 does not process the data or processing strength of the data is low, a deviation exists between the data received by the receiver 2 and the actually sent data. Consequently, the processor of the device 2 cannot correctly identify the received data.

A transmitter equalization parameter is a parameter required by the transmitter 1 to process the data. The transmitter 1 may process the data based on a preconfigured transmitting equalization parameter, for example, reducing a low-frequency signal in the data and enhancing a high-frequency signal in the data. Even if processed data is attenuated or interfered in a transmission process, reduced low-frequency data and enhanced high-frequency data may also offset some attenuated (or interfered) data. In this way, when the data arrives at the receiver 2, a difference between the attenuated data and data that actually needs to be sent (the data that actually needs to be sent may be understood as data that is not processed by the transmitter 1) is small. In this way, the processor of the device 2 can accurately identify the data.

It can be learned that selection of the transmitting equalization parameter plays an important role in data transmission. If a communication link between the device 1 and the device 2 is a PCIe, when the communication link is established between the device 1 and the device 2, the device 1 may perform link negotiation with the device 2. The link negotiation can ensure validity of the communication link, that is, availability of the communication link is ensured, and can further determine related parameters of the communication link, such as a width of the communication link, a number of a logical channel in the communication link, and transmitter equalization parameters.

The transmitter equalization parameter may be determined in a transmitter equalization parameter evaluation process. FIG. 2 shows a plurality of groups of transmitter equalization parameters that can be involved in evaluation.

A group of transmitter equalization parameters is ($C_{-1}$, $C_0$, $C_{+1}$), where $|C_{-1}|+|C_0|+|C_{+1}|=24$.

In the evaluation process, a device 1 and a device 2 may evaluate the plurality of groups of different transmitter equalization parameters, and select one group of transmitter equalization parameters with a better effect. An evaluation process of the one group of transmitter equalization parameters is as follows:

The device 2 selects one group from the plurality of groups of transmitter equalization parameters as to-be-evaluated transmitter equalization parameters, and sends the group of transmitter equalization parameters to the device 1. The device 1 configures an interface 1 by using the group of transmitter equalization parameters. After the configuration is complete, the device 1 may send a test bitstream to the device 2 through the interface 1, and the sent test bitstream is a bitstream processed by the interface 1 by using the group of transmitter equalization parameters.

The device 2 receives the test bitstream through the interface 2. The device 2 may analyze the test bitstream to determine whether the test bitstream is clear. If the test bitstream is clear and easy to identify, an effect of the group of transmitter equalization parameters is good and an evaluation result passes. If the test bitstream is difficult to identify, the effect of the group of transmitter equalization parameters is poor and the evaluation result is failure.

A transmitter equalization parameter evaluation process in a link negotiation process has a time limitation, that all transmitter equalization parameters are evaluated within a limited time period cannot be ensured, and an effect of the finally selected group of transmitter equalization parameters may not be good. Therefore, an embodiment of this disclosure provides a transmitter equalization parameter evaluation method. The following describes, with reference to the accompanying drawings, a system and the transmitter equalization parameter evaluation method to which embodiments of this disclosure are applicable.

Figure 3:
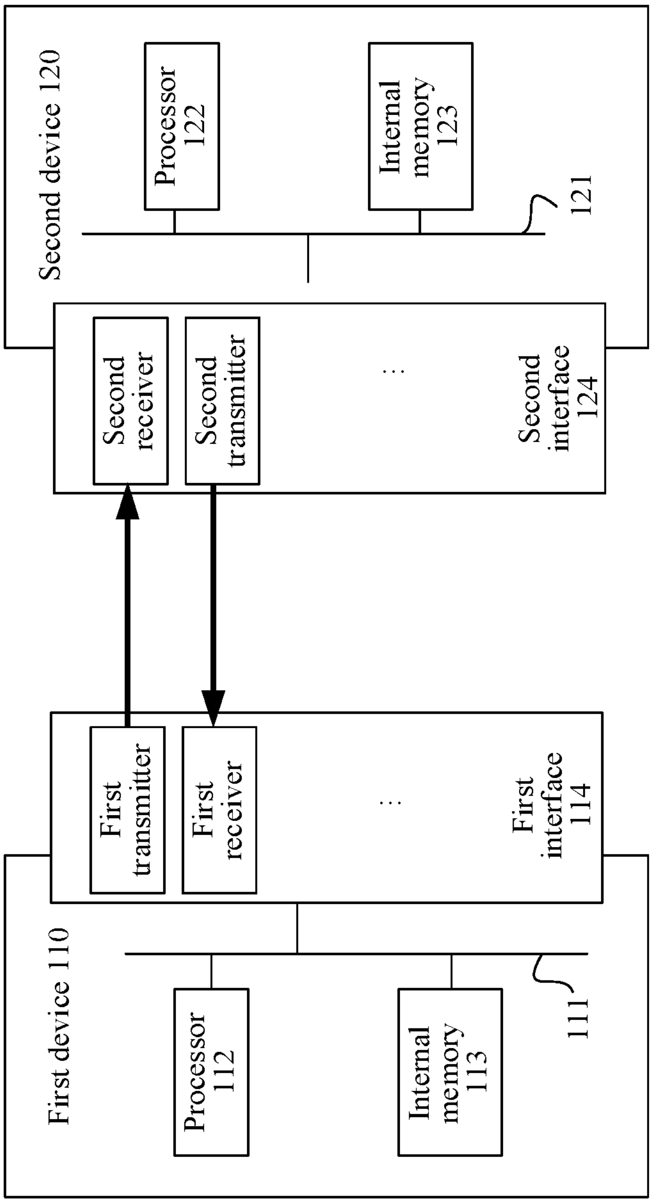
FIG. 3 is a schematic diagram of an architecture of a system according to this disclosure.

FIG. 3 is a schematic diagram of an architecture of a system to which an embodiment of this disclosure is applicable, and the system includes a first device 110 and a second device 120. Optionally, a relay device may be further included between the first device 110 and the second device 120. The relay device may forward data that needs to be transmitted by the first device 110 and the second device 120.

The first device 110 and the second device 120 are two devices that need to communicate with each other. Interfaces may be disposed on the first device 110 and the second device 120, and a communication link may be established between an interface on the first device 110 and an interface on the second device 120. For ease of description, the interface of the first device 110 is referred to as a first interface, and the interface of the second device 120 is referred to as a second interface.

Using the first device 110 as an example, the first device 110 includes a processor 112, an internal memory 113, and a first interface 114. The processor 112, the internal memory 113, and the first interface 114 communicate with each other through a bus 111.

The processor 112 may be a central processing unit (CPU), or the processor 112 may be another general-purpose processor, a digital signal processor (DSP), an application-specific integrated circuit (ASIC), a field-programmable gate array (FPGA) or another programmable logic device, a discrete gate or a transistor logic device, a discrete hardware component, an artificial intelligence chip, an on-die chip, or the like. The general-purpose processor may be a microprocessor, any conventional processor, or the like.

The internal memory 113 may include a volatile memory, for example, a random-access memory (RAM) or a dynamic RAM (DRAM). Alternatively, the internal memory 113 may be a non-volatile memory, for example, a storage-class memory (SCM), or a combination of a volatile memory and a non-volatile memory.

The internal memory 113 may further include another software module required for running a process, for example, an operating system. The operating system may be LINUX™, UNIX™, WINDOWS™, or the like.

The first interface 114 may be configured to communicate with the second device 120. The communication link between the first interface 114 and the second interface may be a radio link, or may be a line link. The line link may be a PCIe link, or may be a link of another type, for example, a Serial Advanced Technology Attachment (SATA) bus, or an Inter-Integrated Circuit (I2C) bus.

The second device 120 includes a processor 122, an internal memory 123, and a second interface 124. The processor 122, the internal memory 123, and the second interface 124 communicate with each other through the bus 111. The processor 122, the internal memory 123, and the second interface 124 are similar to the processor 112, the internal memory 113, and the first interface 114. For details, refer to the foregoing descriptions, and details are not described herein again. A transmitter equalization parameter evaluation method provided in this embodiment of this disclosure may be performed by the processor 122. In other words, the processor 122 may invoke computer executable instructions stored in the internal memory 123 to perform the transmitter equalization parameter evaluation method provided in this embodiment of this disclosure.

In this embodiment of this disclosure, a transmitter equalization parameter evaluation of the first interface 114 is used as an example. When the communication link between the second device 120 and the first device 110 is idle, the second device 120 may start a transmitter equalization parameter evaluation process of the first interface 114 in the first device 110, and perform the transmitter equalization parameter evaluation process of the first interface 114 in the first device 110 based on the communication link. The transmitter equalization parameter evaluation process of the first interface 114 is performed in a time period when the communication link between the first device 110 and the second device 120 is idle. This does not affect transmission of service data between the first device 110 and the second device 120, and can also ensure that the evaluation is implemented on a large quantity of transmitter equalization parameters, so that one group of transmitter equalization parameters with a better effect may be selected subsequently by using an evaluation result.

Figure 4:
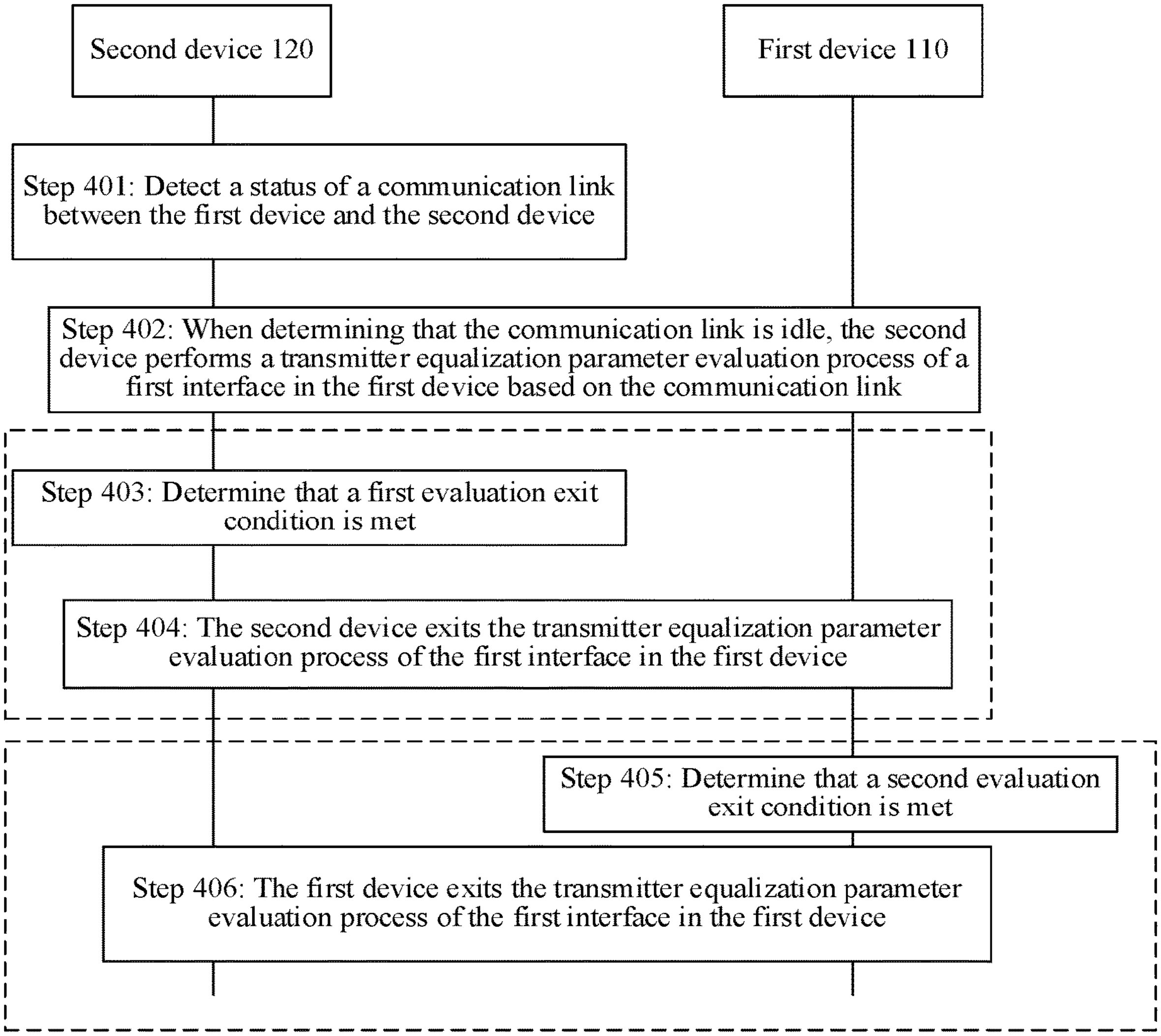
FIG. 4 is a schematic diagram of a transmitter equalization parameter evaluation method according to this disclosure.

With reference to FIG. 4, the following describes a transmitter equalization parameter evaluation method provided in this disclosure. Refer to FIG. 4. The method includes the following steps:

Step 401: A second device 120 detects a status of a communication link between a first device 110 and the second device 120.

In this embodiment of this disclosure, the status of the communication link may be classified into two types: idle and busy. A busy communication link indicates that service data is being transmitted or is to be transmitted on the communication link, and an idle communication link indicates that the service data is not transmitted on the communication link. The service data is data related to a service between the first device 110 and the second device 120. The service data may be data that needs to be sent at a service layer of the first device 110 or data that needs to be sent at a service layer of the second device 120. For example, in a PCIe standard, service data may be a data packet at a transaction layer. Non-service data may be a data packet at a data link layer.

A manner in which the second device 120 detects the status of the communication link is not limited in this embodiment of this disclosure. The following lists several detection manners.

Manner 1: The second device 120 may directly detect whether the service data is transmitted on the communication link.

The second device 120 may detect whether a second transmitter is sending data, or detect whether a second receiver is receiving data. When the second transmitter is sending the data or when the second receiver is receiving the data, the service data is being transmitted on the communication link. In this case, the communication link is busy. When the second transmitter does not send the data, and the second receiver does not receive the data, the service data is not transmitted on the communication link. In this case, the communication link is idle.

In a specific implementation, the second device 120 may detect, within a specific time period, whether the second transmitter sends the service data and whether the second receiver receives the service data. If the second transmitter sends the service data or if the second receiver receives the service data within the specific time period, the service data is transmitted on the communication link. If the second transmitter does not send the service data and the second receiver does not receive the service data within the specific time period, the service data is not transmitted on the communication link.

Manner 2: The second device 120 may determine whether to-be-sent service data exists on the second device 120 side. Optionally, the second device 120 may further determine whether to-be-sent service data exists on the first device 110 side.

When the second device 120 needs to send data to the first device 110, because the second transmitter in the second device 120 sends a limited amount of data in a time period, the to-be-sent service data may be temporarily stored in a buffer of a second interface 124. After the second interface 124 (that is, the second transmitter) may extract data from the buffer, the extracted data is then sent to the first device 110 over the communication link between the first device 110 and the second device 120.

Similarly, when the first device 110 needs to send data to the second device 120, because a first transmitter in the first device 110 sends a limited amount of data in a time period, the to-be-sent service data may be temporarily stored in a buffer of a first interface 114. After the first interface 114 (that is, the first transmitter) may extract data from the buffer, the extracted data is then sent to the second device 120 over the communication link between the first device 110 and the second device 120.

The second device 120 may detect whether a local buffer of the second interface 124 stores the to-be-sent service data, and may further notify the first device 110 to detect whether a local buffer of the first interface 114 stores the to-be-sent service data, to determine whether the to-be-sent service data exists on the first device 110 side.

Certainly, in some possible implementations, when determining whether the to-be-sent service data exists on the first device 110 side, the second device 120 may further detect whether the second receiver of the second interface 124 receives the service data within a specific time period. If the second device 120 does not receive the service data within the specific time period, it is considered that to-be-sent service data does not exist on the first device 110 side. If the second device 120 receives the service data within the specific time period, it is considered that the to-be-sent service data exists on the first device 110 side.

When the buffer of the second interface 124 stores the to-be-sent service data or the buffer of the first interface 114 stores the to-be-sent service data, it indicates that the communication link between the first device 110 and the second device 120 is needed for transmitting the service data. In this case, the communication link is busy. When the buffer of the second interface 124 does not store the to-be-sent service data, and the buffer of the first interface 114 does not store the to-be-sent service data, it indicates that the communication link between the first device 110 and the second device 120 is not needed for transmitting the service data. In this case, the communication link is idle.

The foregoing two manners are merely examples. The second device 120 detects the status of the communication link in manner 1 or manner 2, or may detect the status of the communication link in a manner combining manner 1 and manner 2. Certainly, the second device 120 may also detect the status of the communication link in another manner. For example, if the second device 120 determines that the second device 120 is ready to enter a low power consumption state (the low power consumption state may be understood as entering a power saving mode or a state of no longer sending service data), the second device 120 may also consider that the communication link is idle. In this case, the second device 120 may not enter the low power state, and perform step 402.

Step 402: When determining that the communication link is idle, the second device 120 performs a transmitter equalization parameter evaluation process of the first interface 114 in the first device 110 based on the communication link.

When determining that the communication link is idle, the second device 120 may first notify the first device 110 to start the transmitter equalization parameter evaluation process of the first interface 114 in the first device 110.

There is a plurality of manners in which the second device 120 notifies the first device 110 to start the transmitter equalization parameter evaluation process of the first interface 114 in the first device 110. This embodiment of this disclosure does not limit the manner in which the second device 120 notifies the first device 110 to start the transmitter equalization parameter evaluation process of the first interface 114 in the first device 110.

For example, the second device 120 may send a transmitter equalization parameter evaluation request message to the first device 110 through the second interface 124, where the transmitter equalization parameter evaluation request message is for requesting to evaluate the transmitter equalization parameter of the first interface 114.

The first device 110 may receive the transmitter equalization parameter evaluation request message through the first interface 114. When determining that the transmitter equalization parameter of the first interface 114 can be evaluated, the first device 110 may send a transmitter equalization parameter evaluation response message to the second device 120 through the first interface 114. The transmitter equalization parameter evaluation response message indicates that the transmitter equalization parameter of the first interface 114 can be evaluated. When determining that the transmitter equalization parameter of the first interface 114 cannot be evaluated (for example, the first device 110 has the to-be-sent service data), the first device 110 may send a transmitter equalization parameter evaluation response message to the second device 120 through the first interface 114. The transmitter equalization parameter evaluation response message may indicate that the transmitter equalization parameter of the first interface 114 is rejected to be evaluated.

The second device 120 may receive the transmitter equalization parameter evaluation response message through the second interface 124. After parsing the transmitter equalization parameter evaluation response message and determining that the first device 110 can evaluate the transmitter equalization parameter of the first interface 114, the second device 120 may perform the transmitter equalization parameter evaluation process of the first interface 114 in the first device 110 based on the communication link.

Forms of expression of the transmitter equalization parameter evaluation request message and the transmitter equalization parameter evaluation response message may be flag bits in an exchanged bitstream between the first device 110 and the second device 120. The bitstream is a data stream between the first device 110 and the second device 120. A transmitter equalization parameter request flag bit indicates whether to request to start the transmitter equalization parameter evaluation process of the first interface 114 in the first device 110, and a transmitter equalization parameter response flag bit indicates whether to agree to start a transmitter equalization parameter evaluation process of a high-speed interface in the first device 110.

When the transmitter equalization parameter evaluation process of the first interface 114 does not need to be executed or started, the two flag bits may be null. That is, the two flag bits are not occupied in a normal service transmission process or in another non-transmitter equalization parameter evaluation process. When the transmitter equalization parameter evaluation process of the first interface 114 needs to be executed or started, the two flag bits may be specific values. That is, the two flag bits need to be started or are occupied in the transmitter equalization parameter evaluation process.

When the second device 120 needs to start the transmitter equalization parameter evaluation process of the first interface 114, the second device 120 may set a transmitter equalization parameter request flag bit in a first bitstream to a first value, and send the first bitstream to the first device 110 through the second interface 124. When receiving the first bitstream through the first interface 114, the first device 110 may request, via the second device 120 determined by the first value in the transmitter equalization parameter request flag bit, to start the transmitter equalization parameter evaluation process of the first interface 114. If the first device 110 determines to start the transmitter equalization parameter evaluation process of the first interface 114, the first device 110 may set a transmitter equalization parameter response flag bit in a second bitstream to a second value, and send the second bitstream to the second device 120 through the first interface 114. After receiving the second bitstream through the second interface 124, the second device 120 determines to start the transmitter equalization parameter evaluation process of the first interface 114.

The transmitter equalization parameter evaluation request message and the transmitter equalization parameter evaluation response message may also be expressed in another form. For example, the transmitter equalization parameter evaluation request message and the transmitter equalization parameter evaluation response message may be new messages defined between the first device 110 and the second device 120.

After determining that the transmitter equalization parameter evaluation process of the first interface 114 can be started, the second device 120 may perform the transmitter equalization parameter evaluation process of the first interface 114 based on the communication link. For the transmitter equalization parameter evaluation process of the first interface 114, refer to the foregoing descriptions, and details are not described herein again.

The communication link between the first interface 114 and the second interface 124 may support different transmission rates, that is, data may be transmitted at different transmission rates on the communication link. When the first interface 114 sends data at different transmission rates over the communication link, data attenuation degree and interference degree between the data are also different, and the transmitter equalization parameter of the first interface 114 may also be different.

In this embodiment of this disclosure, the transmitter equalization parameter evaluation process of the first interface 114 includes a transmitter equalization parameter evaluation process of the first interface 114 at different transmission rates. In this way, one group or a plurality of groups of transmitter equalization parameters that are applicable to the first interface 114 at different transmission rates can be determined in the transmitter equalization parameter evaluation process of the first interface 114 at different transmission rates.

A transmitter equalization parameter evaluation process of the first interface 114 at one transmission rate is used as an example herein. It may be learned from descriptions of the transmitter equalization parameter that a plurality of groups of transmitter equalization parameters actually need to be evaluated. The second device 120 and the first device 110 may evaluate any group of transmitter equalization parameters once, and the second device 120 may record an evaluation result of the group of transmitter equalization parameters, for example, recording pass or failure. The second device 120 and the first device 110 may also evaluate any group of transmitter equalization parameters for a plurality of times. The second device 120 may record an evaluation result of the group of transmitter equalization parameters, for example, recording a quantity of pass times or a quantity of failure times, or recording pass ratio (that is, ratio of the quantity of pass times to a quantity of total times) or a failure ratio (that is, a ratio of the quantity of failure times to the quantity of total times).

When the transmitter equalization parameter evaluation process of the first interface 114 at different transmission rates needs to be performed, each time a transmitter equalization parameter evaluation process of the first interface 114 at one transmission rate is performed, the first device 110 and the second device 120 may agree on the transmission rate. For example, the second device 120 may notify the transmission rate by sending a notification message, so that the first device 110 can determine a transmission rate required by a subsequent transmitter equalization parameter evaluation process of the first interface 114. For another example, the second device 120 and the first device 110 may agree on a switching time of the transmission rate, and the transmitter equalization parameter evaluation process of the first interface 114 at one transmission rate is also performed within a specific time interval. When the time interval ends, a next transmission rate is switched, and a transmitter equalization parameter evaluation process of the first interface 114 at a next transmission rate is performed. In this case, the first device 110 and the second device 120 may agree in advance on an initial transmission rate and a switching sequence of the transmission rate. For another example, the second device 120 may directly switch the transmission rate. After switching the transmission rate, the second device 120 may transmit data of a long time at a transmission rate obtained after switching, to ensure that the first device 110 can synchronize with the transmission rate and keep consistent with the second device 120.

It should be noted that, in descriptions of the step 401 to the step 402, the second device 120 is used as a trigger of the transmitter equalization parameter evaluation process of the first interface 114. In some scenarios, the first device 110 is also allowed to detect a status of a communication link. When determining that the communication link is idle, the first device 110 triggers, based on the communication link, the transmitter equalization parameter evaluation process of the first interface 114 in the first device 110. In other words, the first device 110 may also perform the step 401 to the step 402 of detecting the communication link status and starting the transmitter equalization parameter evaluation process of the first interface 114 in the first device 110. A specific manner is similar to a manner described in the step 401 to the step 402, and only execution entities are different. For details, refer to the foregoing content, and details are not described herein again.

In this embodiment of this disclosure, the first device 110 and the second device 120 may also pre-agree on an allowed time range of the transmitter equalization parameter evaluation process of the first interface 114 in the first device 110 that is started when the communication link is idle. For example, it is agreed that a time of the transmitter equalization parameter evaluation process of the first interface 114 in the first device 110 is not less than the first time value. That is, a minimum time for performing the evaluation process is agreed on. By agreeing on the minimum time, it can be ensured that the transmitter equalization parameter evaluation process of the first interface 114 in the first device 110 that is started when the communication link is idle can evaluate at least one group or a plurality of groups of transmitter equalization parameters. This ensures validity of the transmitter equalization parameter evaluation process of the first interface 114 in the first device 110. Certainly, it may also be agreed that a time period of the transmitter equalization parameter evaluation process of the first interface 114 in the first device 110 is not greater than the second time value. In other words, a maximum time for performing the evaluation process is agreed on. By agreeing on the maximum time, it can be ensured that the transmitter equalization parameter evaluation process of the first interface 114 in the first device 110 that is started can be ended within a specific time period, and the communication link is not always occupied.

In this embodiment of this disclosure, in a specific case, the first device 110 or the second device 120 is also allowed to exit the allowed time range of the transmitter equalization parameter evaluation process of the first interface 114 in the first device 110. For example, the first device 110 need to communicate with the second device 120, and the first device 110 or the second device 120 may actively exit the transmitter equalization parameter evaluation process of the first interface 114 in the first device 110. In this way, it can be ensured that the first device 110 and the second device 120 can perform normal service data transmission, and it can be ensured that the transmitter equalization parameter evaluation process of the first interface 114 in the first device 110 does not affect communication between the first device 110 and the second device 120.

For a manner in which the second device 120 exits the transmitter equalization parameter evaluation process of the first interface 114, refer to step 403 to step 404. For a manner in which the first device 110 exits the transmitter equalization parameter evaluation process of the first interface 114, refer to step 405 to step 406.

Step 403: The second device 120 determines that a first evaluation exit condition is met.

The first evaluation exit condition includes all or some of the following conditions.

Condition 1: The second device 120 needs to communicate with the first device 110.

When the second device 120 determines that service data needs to be sent to the first device 110, for example, detects that the buffer of the second interface 124 stores to-be-sent service data, the second device 120 determines to communicate with the first device 110.

Condition 2: A quantity of transmitter equalization parameters evaluated by the second device 120 and the first device 110 reaches a threshold.

The threshold may be represented by a quantity of groups of transmitter equalization parameters. For example, the second device 120 and the first device 110 have evaluated 10 groups of transmitter equalization parameters. The threshold may also be represented by a ratio. For example, the transmitter equalization parameters evaluated by the second device 120 and the first device 110 account for 30% of a total quantity of groups of transmitter equalization parameters (the total quantity of groups is a sum of a quantity of groups of evaluated transmitter equalization parameters and a quantity of groups of non-evaluated transmitter equalization parameters).

Condition 3: The second device 120 determines a currently available transmitter equalization parameter in the transmitter equalization parameter evaluation process.

When the evaluation result indicates that one group of transmitter equalization parameters passes or the pass ratio is greater than a specific value, the second device 120 considers that the group of transmitter parameters is available. In this case, the second device 120 may consider that the currently available transmitter equalization parameter is found, and may exit the transmitter equalization parameter evaluation process of the first interface 114.

Step 404: The second device 120 exits the transmitter equalization parameter evaluation process of the first interface 114 in the first device 110.

The second device 120 may send a transmitter equalization parameter evaluation exit message to the first device 110 through the second interface 124, where the transmitter equalization parameter evaluation exit message is for requesting to exit the transmitter equalization parameter evaluation process of the first interface 114.

The first device 110 may receive the transmitter equalization parameter evaluation exit message through the first interface 114, and when determining that the second device 120 needs to exit from evaluating the transmitter equalization parameter of the first interface 114, the first device 110 may directly exit the transmitter equalization parameter evaluation process of the first interface 114.

The expression form of the transmitter equalization parameter evaluation exit message may be the flag bit in the exchanged bitstream between the first device 110 and the second device 120. A transmitter equalization parameter exit flag bit indicates whether to request to exit the transmitter equalization parameter evaluation process of the first interface 114 in the first device 110.

When it is not necessary to exit the transmitter equalization parameter evaluation process of the first interface 114, the flag bit may be null. That is, the flag bit is not occupied in the normal service transmission process or the transmitter equalization parameter evaluation process. When the transmitter equalization parameter evaluation process of the first interface 114 needs to be exited, the flag bit may be a specific value. That is, the flag bit is occupied when the transmitter equalization parameter evaluation process needs to be exited.

When the second device 120 needs to exit the transmitter equalization parameter evaluation process of the first interface 114, the second device 120 may set the transmitter equalization parameter exit flag bit in a third bitstream to a third value, and send the third bitstream to the first device 110 through the second interface 124. When receiving the third bitstream through the first interface 114, the first device 110 may request, via the second device 120 determined by the third value in the transmitter equalization parameter exit flag bit, to exit the transmitter equalization parameter evaluation process of the first interface 114. The first device 110 may exit a process of evaluating the transmitter equalization parameter evaluation process of the first interface 114.

The transmitter equalization parameter evaluation exit message may also be expressed in another form. For example, the transmitter equalization parameter evaluation exit message may be a new message defined between the first device 110 and the second device 120.

It should be noted that, when the second device 120 needs to exit the transmitter equalization parameter evaluation process of the first interface 114 in the first device 110, the second device 120 may not send the transmitter equalization parameter evaluation exit message, but directly exit the transmitter equalization parameter evaluation process of the first interface 114 in the first device 110, that is, the second device 120 does not send, to the first device 110, information for performing the transmitter equalization parameter evaluation process of the first interface 114 in the first device 110, for example, the second device 120 does not send the transmitter equalization parameter that needs to be evaluated, and switches to a normal working state.

Step 405: The first device 110 determines that a second evaluation exit condition is met.

The second evaluation exit condition includes all or some of the following conditions.

Condition 1: The first device 110 needs to communicate with the second device 120.

When the first device 110 determines that service data needs to be sent to the second device 120, for example, detects that the buffer of the first interface 114 stores to-be-sent service data, the second device 120 determines to communicate with the first device 110.

Condition 2: The first device 110 needs to process another operation.

For example, the first device 110 needs to perform operations such as self-check and restarting. In this case, the first device 110 may exit the transmitter equalization parameter evaluation process of the first interface 114.

Step 406: The first device 110 exits the transmitter equalization parameter evaluation process of the first interface 114 in the first device 110. An execution manner of this step is similar to that of the step 404, and a difference lies in different execution entities. For details, refer to the step 404, and details are not described herein again.

It should be noted that, the first device 110 may also directly exit the transmitter equalization parameter evaluation process of the first interface 114 in the first device 110 without sending the transmitter equalization parameter evaluation exit message, that is, no longer send the test bitstream.

Certainly, the step 403 to the step 406 are only a scenario in which the first device 110 or the second device 120 actively exits the transmitter equalization parameter evaluation process of the first interface 114 in the first device 110. This embodiment of this disclosure does not limit a scenario in which the first device 110 or the second device 120 actively exits the transmitter equalization parameter evaluation process of the first interface 114 in the first device 110.

In the foregoing manner, provided that the communication link between the first device 110 and the second device 120 is idle, the first device 110 and the second device 120 may perform the transmitter equalization parameter evaluation process for the first interface 114, and when the first device 110 and the second device 120 need to communicate with each other, the first device 110 and the second device 120 may exit the transmitter equalization parameter evaluation process of the first interface 114. The starting and exiting of the transmitter equalization parameter evaluation process of the first interface 114 are flexible.

In an actual application, the transmitter equalization parameter evaluation process of the first interface 114 is started for one or more times, so that all the transmitter equalization parameters of the first interface 114 can be evaluated. The second device 120 may select one group or a plurality of groups of transmitter equalization parameters based on an evaluation result of all the transmitter equalization parameters. For example, the second device 120 selects one group or a plurality of groups of transmitter evaluation parameters at one transmission rate (for example, selects a transmitter evaluation parameter of which the evaluation result passes, or of which the pass ratio exceeds the first threshold, or of which failure ratio is lower than the second threshold). After selecting a transmitter equalization parameter, the second device 120 may notify the first device 110 of the selected transmitter equalization parameter, and indicate that the transmitter equalization parameter is available, or indicate that the first device 110 updates a current transmitter equalization parameter by using the selected transmitter equalization parameter.

The first device 110 and the second device 120 perform the transmitter equalization parameter evaluation process of the first interface 114 in the first device 110, to obtain a relatively appropriate transmitter equalization parameter. When the transmitter equalization parameter evaluation process of the first interface 114 is started for one or more times to evaluate some groups of transmitter equalization parameters of the first interface 114, and the second device 120 finds, based on an evaluation result, one group or a plurality of groups of transmitter enhancement parameters that meet a requirement (for example, selecting a transmitter evaluation parameter of which evaluation result passes, or of which pass ratio exceeds the first threshold, or of which failure ratio is lower than the second threshold), the second device 120 may also exit the transmitter equalization parameter evaluation process of the first interface 114 in the first device 110, and sends the sent one group or a plurality of groups of transmitter enhancement parameters to the first device 110, and indicates that the transmitter equalization parameter is available, or indicates that the first device 110 updates the current transmitter equalization parameter by using the selected transmitter equalization parameter. Then, the transmitter equalization parameter evaluation process of the first interface 114 in the first device 110 may no longer be started when the communication link is idle. That is, as long as one group or a plurality of groups of transmitter enhancement parameters that meet requirements are found, the transmitter equalization parameter evaluation process of the first interface 114 in the first device 110 may be stopped, and a remaining transmitter equalization parameter that is not evaluated may not be evaluated.

Figure 5:
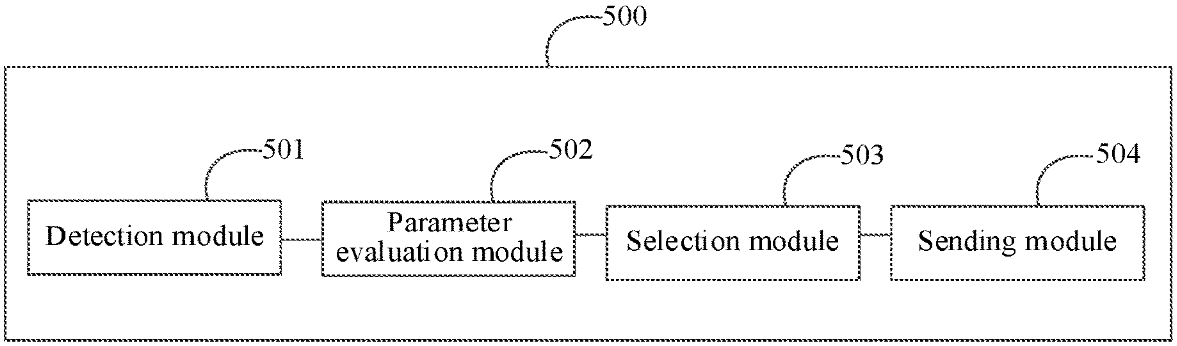
FIG. 5 is a schematic diagram of an evaluation apparatus according to this disclosure.

Based on a same concept as the method embodiments, an embodiment of this disclosure further provides an evaluation apparatus, where the evaluation apparatus is configured to perform the method performed by the second device in the method embodiment shown in FIG. 4. For related features, refer to the foregoing method embodiment, and details are not described herein again. As shown in FIG. 5, an evaluation apparatus 500 is configured to evaluate a transmitter equalization parameter of a high-speed interface in a first device, and the evaluation apparatus 500 includes a detection module 501 and a parameter evaluation module 502.

The detection module 501 is configured to detect whether a communication link between a first device and a second device is idle, where the communication link is established through the high-speed interface in the first device.

The parameter evaluation module 502 is configured to perform a transmitter equalization parameter evaluation process of the high-speed interface in the first device based on the communication link.

In a possible implementation, the parameter evaluation module 502 may further exit the transmitter equalization parameter evaluation process of the high-speed interface in the first device, when determining that an evaluation exit condition is met.

In a possible implementation, the evaluation exit condition includes all or some of the following:

1. The second device needs to communicate with the first device.
2. A quantity of evaluated transmitter equalization parameters reaches a threshold.
3. A transmitter equalization parameter that passes evaluation is obtained in the transmitter equalization parameter evaluation process of the high-speed interface in the first device. The transmitter equalization parameter that passes the evaluation indicates that an evaluation result of the transmitter equalization parameter passes or pass ratio of the transmitter equalization parameter is higher than the threshold.

In a possible implementation, that the communication link is idle indicates that service data is not transmitted on the communication link.

In a possible implementation, when detecting a status of the communication link, the detection module 501 may detect whether the second device sends service data or receives service data over the communication link, if the second device does not send the service data or does not receive the service data over the communication link, that the link is idle is described. The detection module 501 may also determine whether the second device has to-be-sent service data, if the second device does not have the to-be-sent service data, that the link is idle is described.

In a possible implementation, when performing the transmitter equalization parameter evaluation process, the parameter evaluation module 502 may interact with the first device based on the communication link and one or a plurality of groups of transmitter equalization parameters, to evaluate the one group or the plurality of groups of transmitter equalization parameters.

In a possible implementation, the plurality of groups of transmitter equalization parameters include all the transmitter equalization parameters of the high-speed interface in the first device.

In a possible implementation, the evaluation apparatus further includes a selection module 503 and a sending module 504.

The selection module 503 is configured to select a transmitter equalization parameter based on the evaluation result of the one or the plurality of groups of transmitter equalization parameters.

The sending module 504 is configured to send the selected group of transmitter equalization parameters to the first device, to indicate that the selected transmitter equalization parameter is available.

In a possible implementation, the transmitter equalization parameter evaluation process of the high-speed interface in the first device includes a transmitter equalization parameter evaluation process at one or more transmission rates, and the transmission rate is a transmission rate of data in the communication link.

In a possible implementation, the sending module 504 may further send a notification message to the first device, where the notification message indicates a transmission rate, and the parameter evaluation module 502 may perform the transmitter equalization parameter evaluation process of the high-speed interface in the first device based on the communication link at the transmission rate.

It should be noted that, module division in embodiments of this disclosure is an example, and is merely logical function division. During actual implementation, another division manner may be used. Functional modules in embodiments of this disclosure may be integrated into one processing module, or each of the modules may exist alone physically, or two or more modules may be integrated into one module. The integrated module may be implemented in a form of hardware, or may be implemented in a form of a software functional module.

All or some of the foregoing embodiments may be implemented by using software, hardware, firmware, or any combination thereof. When software is used to implement the embodiments, all or some of the foregoing embodiments may be implemented in a form of a computer program product. The computer program product includes one or more computer instructions. When the computer program instructions are loaded or executed on a computer, the processes or functions according to the embodiments of the present disclosure are all or partially generated. The computer may be a general-purpose computer, a dedicated computer, a computer network, or other programmable apparatuses. The computer instructions may be stored in a computer-readable storage medium or may be transmitted from one computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, and microwave) manner. The computer-readable storage medium may be any usable medium accessible to a computer, or a data storage device, for example, a server or a data center, integrating one or more usable media. The usable medium may be a magnetic medium (for example, a floppy disk, a hard disk, or a magnetic tape), an optical medium (for example, a DIGITAL VERSATILE DISC (DVD)), or a semiconductor medium. The semiconductor medium may be a solid-state drive (SSD).

In a simple embodiment, a person skilled in the art may figure out that the second device in the embodiment shown in FIG. 4 or the evaluation apparatus shown in FIG. 5 may be in a form of the second device shown in FIG. 3. A processor 122, an internal memory 123, and a communications interface (for example, a second interface 124) are included. For descriptions of the processor 122, the internal memory 123, and the second interface 124, refer to the foregoing memory, and details are not described herein again.

A person skilled in the art should understand that embodiments of this disclosure may be provided as a method, a system, or a computer program product. Therefore, this disclosure may use a form of a hardware-only embodiment, a software-only embodiment, or an embodiment combining software and hardware. In addition, this disclosure may use a form of a computer program product that is implemented on one or more computer-usable storage media (including but not limited to a disk memory, a compact disc read-only memory (CD-ROM), an optical memory, and the like) that include computer-usable program code.

This disclosure is described with reference to flowcharts and/or block diagrams of the method, the device (system), and the computer program product according to this disclosure. It should be understood that computer program instructions may be used to implement each process and/or each block in the flowcharts and/or the block diagrams and a combination of processes and/or blocks in the flowcharts and/or the block diagrams. These computer program instructions may be provided to a general-purpose computer, a dedicated computer, an embedded processor, or a processor of any other programmable data processing device to generate a machine, so that an apparatus configured to implement functions specified in one or more processes in the flowcharts and/or one or more blocks in the block diagrams is generated by using instructions executed by the computer or the processor of another programmable data processing device.

These computer program instructions may alternatively be stored in a computer-readable memory that can instruct the computer or any other programmable data processing device to work in a specific manner, so that the instructions stored in the computer-readable memory generate an artifact that includes an instruction apparatus. The instruction apparatus implements a specific function in one or more processes in the flowcharts and/or in one or more blocks in the block diagrams.

These computer program instructions may alternatively be loaded onto a computer or another programmable data processing device, so that a series of operation steps are performed on the computer or another programmable device, thereby generating computer-implemented processing. Therefore, the instructions executed on the computer or another programmable device provide steps for implementing a specific function in one or more processes in the flowcharts and/or in one or more blocks in the block diagrams.

It is clear that, a person skilled in the art can make various modifications and variations to this disclosure without departing from the scope of this disclosure. In this way, this disclosure is intended to cover these modifications and variations of this disclosure provided that they fall within the scope of protection defined by the following claims and their equivalent technologies.

What is claimed is:

1. A method implemented by a second device, wherein the method comprises:

establishing, through a high-speed interface in a first device, a communication link between the first device and the second device;

detecting that the communication link is idle;

performing, based on detecting that the communication link is idle, a transmitter equalization parameter evaluation process of the high-speed interface;

continuing the transmitter equalization parameter evaluation process when the communication link remains idle;

detecting that service data is to be sent on the communication link; and exiting, in response to the detecting, the transmitter equalization parameter evaluation process.

2. The method of claim 1, wherein exiting the transmitter equalization parameter evaluation process comprises exiting the transmitter equalization parameter evaluation process when an evaluation exit condition is met, and wherein the evaluation exit condition comprises the second device needs to communicate with the first device.

3. The method of claim 2, wherein the evaluation exit condition further comprises a quantity of evaluated transmitter equalization parameters reaches a threshold.

4. The method of claim 1, wherein that the communication link is idle indicates that no service data is transmitted on the communication link.

5. The method of claim 1, wherein detecting that the communication link is idle comprises detecting that the second device does not send first service data or does not receive second service data over the communication link.

6. The method of claim 1, wherein performing the transmitter equalization parameter evaluation process comprises interacting, based on the communication link, with the first device to evaluate one group of transmitter equalization parameters or groups of transmitter equalization parameters.

7. The method of claim 6, wherein the groups of transmitter equalization parameters comprise all transmitter equalization parameters of the high-speed interface.

8. The method of claim 6, further comprising:

selecting, based on an evaluation result of the one group of transmitter equalization parameters or the groups of transmitter equalization parameters, a selected group of transmitter equalization parameters comprising a transmitter equalization parameter; and sending, to the first device, the selected group of transmitter equalization parameters to indicate that the transmitter equalization parameters are available.

9. The method of claim 1, further comprising performing the transmitter equalization parameter evaluation process at one or more transmission rates of data in the communication link.

10. The method of claim 9, further comprising:

sending, to the first device, a notification message indicating a transmission rate of the one or more transmission rates; and further performing, at the transmission rate, the transmitter equalization parameter evaluation process.

11. A computing device comprising:

a non-transitory memory storage configured to store instructions; and a processor in communication with the non-transitory memory storage and configured to execute the instructions to cause the computing device to:

establish, through a high-speed interface in a first device, a communication link between the first device and the computing device;

detect that communication link is idle;

perform, based on detecting that the communication link is idle, a transmitter equalization parameter evaluation process of the high-speed interface;

continue the transmitter equalization parameter evaluation process when the communication link remains idle;

detect that service data is to be sent on the communication link; and exit, in response to the detecting, the transmitter equalization parameter evaluation process.

12. A computer program product comprising computer-executable instructions that are stored on a non-transitory computer-readable storage medium and that, when executed by a processor, cause a computing device to:

establish, through a high-speed interface in a first device, a communication link between the first device and the computing device;

detect that the communication link is idle;

perform, based on detecting that the communication link is idle, a transmitter equalization parameter evaluation process of the high-speed interface;

continue the transmitter equalization parameter evaluation process when the communication link remains idle;

detect that service data is to be sent on the communication link; and exit, in response to the detecting, the transmitter equalization parameter evaluation process.

13. The computer program product of claim 12, wherein the computer-executable instructions further cause the computing device to exiting the transmitter equalization parameter evaluation process comprises exiting the transmitter equalization parameter evaluation process when an evaluation exit condition is met, and wherein the evaluation exit condition comprises a second device needs to communicate with the first device.

14. The computer program product of claim 13, wherein the evaluation exit condition further comprises obtaining a transmitter equalization parameter that passes evaluation using the transmitter equalization parameter evaluation process.

15. The computer program product of claim 12, wherein that the communication link is idle indicates that no service data is transmitted on the communication link.

16. The computer program product of claim 12, wherein the computer-executable instructions further cause the computing device to detect that the computing device does not comprise to-be-sent service data.

17. The computer program product of claim 12, wherein the computer-executable instructions further cause the computing device to interact, based on the communication link, with the first device to evaluate one group of transmitter equalization parameters or groups of transmitter equalization parameters.

18. The computer program product of claim 17, wherein the groups of transmitter equalization parameters comprise all the transmitter equalization parameters.

19. The computer program product of claim 17, wherein the computer-executable instructions further cause the computing device to:

select, based on an evaluation result of the one group of transmitter equalization parameters or the groups of transmitter equalization parameters, a selected group of transmitter equalization parameters comprising a transmitter equalization parameter; and send, to the first device, the selected group of transmitter equalization parameters to indicate that the transmitter equalization parameters are available.

20. The computer program product of claim 12, wherein the computer-executable instructions further cause the computing device to perform the transmitter equalization parameter evaluation process at one or more transmission rates of data in the communication link.

* * * * *